(12) United States Patent
Minamida et al.

(10) Patent No.: US 11,274,845 B2
(45) Date of Patent: Mar. 15, 2022

(54) METHOD OF SEARCHING FOR REFRIGERANT LEAK LOCATION

(71) Applicant: Daikin Industries, LTD., Osaka (JP)

(72) Inventors: Tomoatsu Minamida, Osaka (JP); Tomoyuki Haikawa, Osaka (JP); Shigeharu Taira, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 47 days.

(21) Appl. No.: 16/493,027

(22) PCT Filed: Mar. 30, 2018

(86) PCT No.: PCT/JP2018/014016
§ 371 (c)(1),
(2) Date: Sep. 11, 2019

(87) PCT Pub. No.: WO2018/182037
PCT Pub. Date: Oct. 4, 2018

(65) Prior Publication Data
US 2020/0011560 A1    Jan. 9, 2020

(30) Foreign Application Priority Data

Mar. 31, 2017  (JP) .............................. JP2017-072644

(51) Int. Cl.
*F24F 11/36*  (2018.01)
*F24F 11/89*  (2018.01)
(Continued)

(52) U.S. Cl.
CPC .............. *F24F 11/36* (2018.01); *F24F 11/89* (2018.01); *F25B 49/02* (2013.01); *G01M 3/00* (2013.01); *F25B 2500/222* (2013.01)

(58) Field of Classification Search
CPC ..... F24F 11/36; F24F 11/89; F25B 2500/222; F25B 49/02; G01M 3/00
See application file for complete search history.

(56) References Cited

U.S. PATENT DOCUMENTS 5,167,867 A * 12/1992 Quaife .................... C10L 3/006
  252/408.1
6,073,455 A *  6/2000 Tachigori ................. F24F 11/89
  62/129
(Continued)

FOREIGN PATENT DOCUMENTS

CN      105518377 A     4/2016
GB        2554267 A     3/2018
(Continued)

*Primary Examiner* — Henry T Crenshaw
(74) *Attorney, Agent, or Firm* — Birch, Stewart, Kolasch & Birch, LLP (57) ABSTRACT

A method of searching for a refrigerant leak location is provided which can easily specify the refrigerant leak location. In the method of searching for the refrigerant leak location in a refrigeration apparatus (100) in which a refrigerant is charged and which includes a refrigeration circuit (10) performing a refrigeration cycle, the refrigeration circuit (10) is prepared in a state that the refrigerant containing an odor component is charged therein, and the refrigerant leak location is specified by letting a dog capable of detecting the odor component to run along the refrigeration circuit (10).

9 Claims, 5 Drawing Sheets (51) Int. Cl.
*F25B 49/02* (2006.01)
*G01M 3/00* (2006.01)

(56) References Cited

U.S. PATENT DOCUMENTS

| | | | |
|---|---|---|---|
| 6,077,712 A | 6/2000 | Livingston | |
| 2006/0049329 A1* | 3/2006 | Duerr | F25B 45/00 250/200 |
| 2008/0163671 A1* | 7/2008 | Dugan | G01N 33/0073 73/23.34 |
| 2009/0107157 A1* | 4/2009 | Dube | F25B 49/005 62/149 |
| 2009/0194744 A1* | 8/2009 | Adebimpe | F42B 8/00 252/408.1 |
| 2013/0250124 A1* | 9/2013 | Furry | G01M 3/04 348/164 |
| 2015/0338136 A1 | 11/2015 | Suzuki | |
| 2016/0321503 A1* | 11/2016 | Zhou | B64C 39/024 |
| 2017/0198936 A1* | 7/2017 | Yamaguchi | F24F 11/74 |
| 2017/0234757 A1 | 8/2017 | Wang et al. | |
| 2018/0222581 A1 | 8/2018 | Nagasawa et al. | |
| 2018/0375008 A1* | 12/2018 | Xie | H01L 37/025 |
| 2019/0056133 A1* | 2/2019 | Green | F25B 5/02 |
| 2020/0011560 A1* | 1/2020 | Minamida | F24F 11/36 |

FOREIGN PATENT DOCUMENTS

| | | | |
|---|---|---|---|
| JP | 46-40540 A | | 11/1971 |
| JP | 2-289669 A | | 11/1990 |
| JP | 6-198586 A | | 7/1994 |
| JP | 8-261893 A | | 10/1996 |
| JP | 11-230648 A | | 8/1999 |
| JP | 11-237357 A | | 8/1999 |
| JP | 2000-329300 A | | 11/2000 |
| JP | 2006-291112 A | | 10/2006 |
| JP | 2007-515621 A | | 6/2007 |
| JP | 2011-163565 A | | 8/2011 |
| JP | 2014-202451 A | | 10/2014 |
| JP | 2014 224611 | * | 12/2014 |
| JP | 2014-224611 A | | 12/2014 |
| WO | WO 2005/001409 A2 | | 1/2005 |
| WO | WO 2015/194596 A1 | | 12/2015 |
| WO | WO 2017/002215 A1 | | 1/2017 |
| WO | WO 2017/022556 A1 | | 2/2017 |

* cited by examiner

METHOD OF SEARCHING FOR REFRIGERANT LEAK LOCATION

TECHNICAL FIELD

The present disclosure relates to a method of searching for a refrigerant leak location.

BACKGROUND ART

For the purpose of reducing the global warming, it has recently been demanded to use, in a refrigeration apparatus, a refrigerant with little impact on the environment. As refrigerants with less impact on the environment than HFC (hydrofluorocarbon) refrigerants that have hitherto been widely used, there are refrigerants having low GWP (Global Warming Potential) values.

However, many of the refrigerants having low GWP values are combustible and toxic.

Meanwhile, a technique for detecting a refrigerant leak location has been contrived in case of refrigerant leak from a refrigeration apparatus. For example, Patent Literature 1 (WO 2017/002215) proposes a method of specifying the leak location by setting refrigerant sensors, which are assigned with individual addresses, at multiple locations, and by checking the address of the refrigerant sensor that has detected the leaked refrigerant.

SUMMARY OF THE INVENTION

Technical Problem

In the refrigeration apparatus, however, there are innumerable locations at which the refrigerant leak may occur. Thus, according to the method proposed in Patent Literature 1, the refrigerant sensors need to be set at all of those locations.

A method of detecting the leak location by applying, for example, soapy water to generate bubbles at the leak location is also known. However, such a method needs a long time to specify the leak location and is intricate.

The present disclosure has been accomplished in consideration of the above-described point, and an object of the present disclosure is to provide a method of searching for a refrigerant leak location, which can easily specify the leak location.

Solution to Problem

A method of searching for a refrigerant leak location according to a first aspect of the present invention is a method of searching for a refrigerant leak location in a refrigeration apparatus and includes a first step and a second step. The refrigeration apparatus includes a refrigeration circuit. A refrigerant is charged in the refrigeration circuit, and the refrigeration circuit performs a refrigeration cycle. In the first step, the refrigeration circuit in which the refrigerant containing at least one of an odor component, a toxic component, and a fluorescent component is charged is prepared. In the second step, detection means detecting a particular component among the odor component, the toxic component, and the fluorescent component, the particular component being contained in the refrigerant, is caused to run by itself along the refrigeration circuit and to specify the leak location.

The term "detection means" implies means other than humans, the means being able to run by itself and to detect the particular component.

With the method of searching for the refrigerant leak location according to this aspect, the refrigerant leak location can be searched by causing the detection means to run by itself along the refrigeration circuit and to detect the particular component among the odor component, the toxic component, and the fluorescent component, the particular component being contained in the refrigerant. Thus, since there is no need of searching for the refrigerant leak location along the refrigeration circuit by humans, the leak location can easily be specified.

A method of searching for a refrigerant leak location according to a second aspect of the present invention is the method of searching for the refrigerant leak location according to the first aspect of the present invention, wherein the refrigerant is single one or a mixture of two or more among a flammable refrigerant, a low flammable refrigerant, a very low flammable refrigerant, and a highly toxic refrigerant.

Here, the flammable refrigerant is, for example, a refrigerant classified as A3 in accordance with the refrigerant safety classification standards of ASHRAE34. The low flammable refrigerant is, for example, a refrigerant classified as A2 in accordance with the refrigerant safety classification standards of ASHRAE34. The very low flammable refrigerant is, for example, a refrigerant classified as A2L in accordance with the refrigerant safety classification standards of ASHRAE34. The highly toxic refrigerant is, for example, a refrigerant classified as B in accordance with the refrigerant safety classification standards of ASHRAE34.

With the method of searching for the refrigerant leak location according to this aspect, even when a refrigerant with a possibility of burning or a toxic hazard in the event of leak is used in the refrigeration circuit, the refrigerant leak location can easily be searched while humans can be kept from being exposed to a dangerous condition.

A method of searching for a refrigerant leak location according to a third aspect of the present invention is the method of searching for the refrigerant leak location according to the first aspect of the present invention, wherein the refrigerant is R32 or a refrigerant having a lower GWP value than R32.

Here, the refrigerant having the lower GWP value than R32 is, for example, a natural refrigerant such as R717 and, R170, R1270, R290, R600 or R600a, R152a, or a mixed refrigerant of the formers.

With the method of searching for the refrigerant leak location according to this aspect, the refrigerant leak location can easily be searched when the refrigerant having the low GWP (Global Warming Potential) value is used in the refrigeration circuit.

A method of searching for a refrigerant leak location according to a fourth aspect of the present invention is the method of searching for the refrigerant leak location according to any one of the first to third aspects of the present invention, wherein the refrigeration circuit in which the refrigerant containing the odor component is charged is prepared in the first step.

When the refrigerant has an odor in itself, the refrigeration circuit in which the refrigerant is charged without being mixed with any additional odorant may be prepared. When the refrigerant has no odor or a weak odor, the refrigeration circuit in which the refrigerant mixed with an additional odorant is charged may be prepared.

With the method of searching for the refrigerant leak location according to this aspect, the refrigerant leak location can be searched by using the detection means capable of detecting the odor component contained in the refrigerant. For example, the accuracy in searching for the leak location can be increased by using the detection means capable of detecting an odor that is difficult to detect by humans.

A method of searching for a refrigerant leak location according to a fifth aspect of the present invention is the method of searching for the refrigerant leak location according to the fourth aspect of the present invention, wherein a dog is used as the detection means in the second step.

With the method of searching for the refrigerant leak location according to this aspect, the leak location can be specified with higher accuracy by using, as the detection means, a dog having a better sense of smell than humans.

A method of searching for a refrigerant leak location according to a sixth aspect of the present invention is the method of searching for the refrigerant leak location according to any one of the first to third aspects of the present invention, wherein the refrigeration circuit in which the refrigerant containing the toxic component is charged is prepared in the first step.

With the method of searching for the refrigerant leak location according to this aspect, the refrigerant leak location can be searched by using the detection means capable of detecting the toxic component contained in the refrigerant. For example, even when the refrigerant containing a toxic component harmful to human bodies is used, the leak location can be searched while the harm to the human bodies is suppressed, by using the detection means instead of humans.

A method of searching for a refrigerant leak location according to a seventh aspect of the present invention is the method of searching for the refrigerant leak location according to any one of the fourth to sixth aspects of the present invention, wherein a location at which a concentration of the odor component or the toxic component is maximum or higher than a predetermined concentration is specified in the second step.

With the method of searching for the refrigerant leak location according to this aspect, the leak location can be specified with higher accuracy by specifying the location at which the concentration of the odor component or the toxic component is maximum or higher than the predetermined concentration.

A method of searching for a refrigerant leak location according to an eighth aspect of the present invention is the method of searching for the refrigerant leak location according to any one of the first to third aspects of the present invention, wherein the refrigeration circuit in which the refrigerant containing the fluorescent component is charged is prepared in the first step.

With the method of searching for the refrigerant leak location according to this aspect, the refrigerant leak location can be searched by using the detection means capable of detecting the fluorescent component contained in the refrigerant. For example, even when there is a place in the refrigeration circuit to which the self-running detection means is difficult to approach, the leak location can be searched by specifying a fluorescence emitting location from some distance away.

A method of searching for a refrigerant leak location according to a ninth aspect of the present invention is the method of searching for the refrigerant leak location according to any one of the first to seventh aspects of the present invention, wherein a self-propelled device is used in the second step. The self-propelled device includes, as the detection means, a particular-component detection sensor to detect the particular component contained in the refrigerant, and it is driven by a drive motor to run by itself.

With the method of searching for the refrigerant leak location according to this aspect, because of using the self-propelled device that includes the particular-component detection sensor to detect the particular component contained in the refrigerant and that is driven by the drive motor to run by itself, the refrigerant leak location can easily be searched without any human aid of giving motive power to run the self-propelled device.

A method of searching for a refrigerant leak location according to a tenth aspect of the present invention is the method of searching for the refrigerant leak location according to the ninth aspect of the present invention, wherein the self-propelled device is a flying vehicle including a propeller driven and operated by the drive motor.

With the method of searching for the refrigerant leak location according to this aspect, since the flying vehicle is used as the self-propelled device, even when the refrigerant leak location is present at a high position, it can be searched by causing the flying vehicle to move in air.

A method of searching for a refrigerant leak location according to an eleventh aspect of the present invention is the method of searching for the refrigerant leak location according to the ninth or tenth aspect of the present invention, wherein the self-propelled device includes a notification unit. The notification unit issues a notification depending on a detection result of the particular-component detection sensor.

The type of notification is not limited to particular one, and it may be, for example, a notification of issuing sounds, a notification of lighting-up or blinking a lamp, a notification of sending information detected by the particular-component detection sensor to an external device to which the self-propelled device is connected via a communication network, or a combination of those notifications.

With the method of searching for the refrigerant leak location according to this aspect, a user can easily recognize the leak location searched by the self-propelled device.

DESCRIPTION OF EMBODIMENTS

A method of searching for a refrigerant leak location according to an embodiment will be described below with reference to the drawings. It is to be noted that the following embodiment is merely a practical example and is not intended to limit the technical scope of the present disclosure, and that the following embodiment can be modified as appropriate within the scope not departing from the gist of the present disclosure.

(1) Air Conditioner 100

Figure 1:
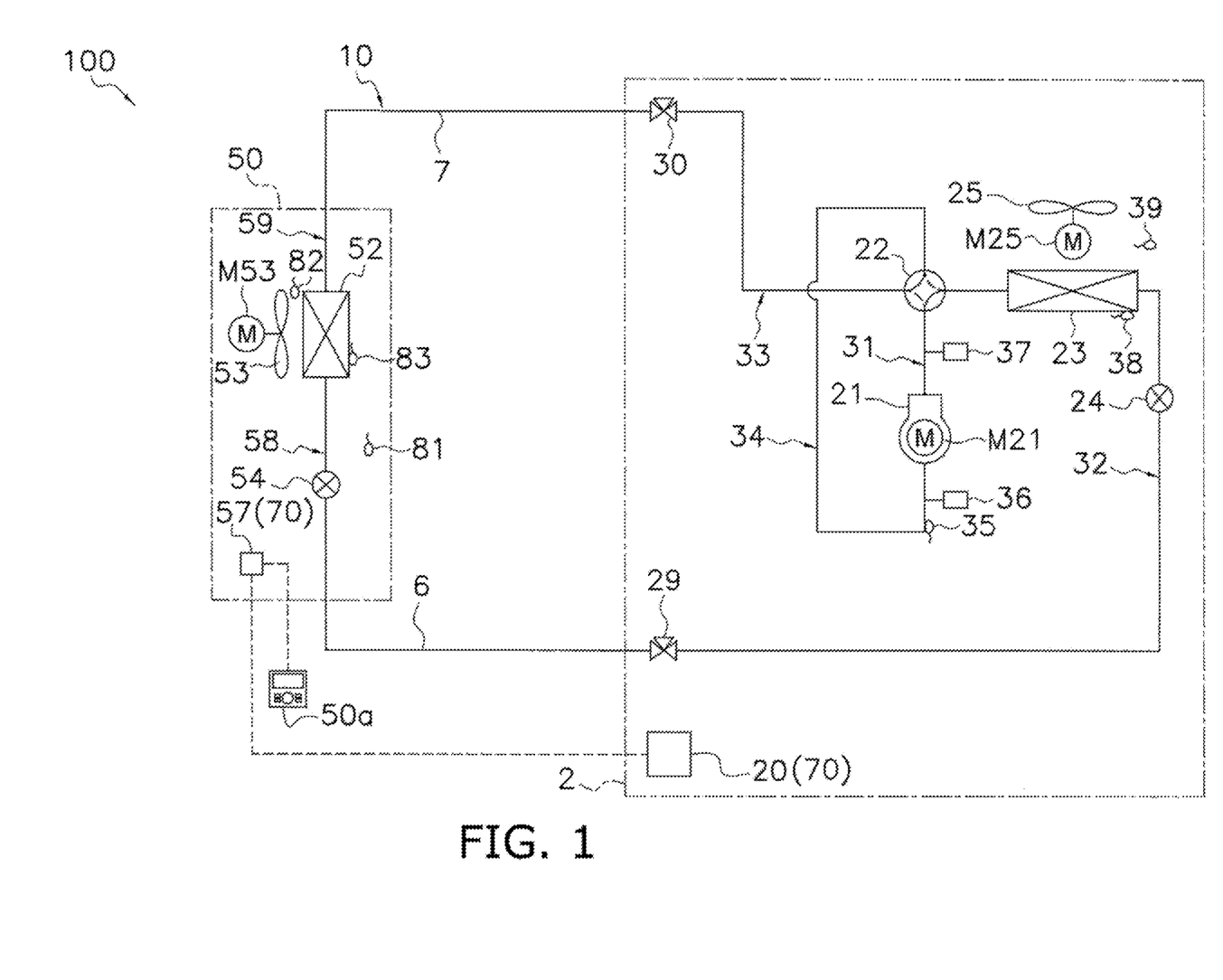
FIG. 1 is an overall diagrammatic view of an air conditioner.

FIG. 1 is an overall diagrammatic view of an air conditioner 100. The air conditioner 100 is an apparatus for conditioning air in a target space by carrying out a vapor compression refrigeration cycle.

The air conditioner 100 mainly includes an outdoor unit 2, an indoor unit 50, a liquid refrigerant transfer pipe 6 and a gas refrigerant transfer pipe 7 each connecting the outdoor unit 2 and the indoor unit 50, a plurality of remote controllers 50*a* each serving as an input device and an output device, and a controller 70 for controlling the operation of the air conditioner 100.

The air conditioner 100 carries out a refrigeration cycle in which a refrigerant charged in a refrigeration circuit 10 is sequentially compressed, cooled or condensed, depressurized, heated or evaporated, and then compressed again. In this embodiment, R32 is filled in the refrigeration circuit 10 as the refrigerant to carry out the vapor compression refrigeration cycle.

The refrigerant filled in the refrigeration circuit 10 contains an odorant with which, in the event of refrigerant leak, the refrigerant leak can be searched. The odorant is not limited to particular one, and it may be, for example, any of the following strong odor compounds, fragrances, or mixtures thereof.

The strong odor compounds may be mercaptans, thioethers, amines, or mixtures thereof. Examples of mercaptans include methyl mercaptan, ethyl mercaptan, n-propyl mercaptan, iso-propyl mercaptan, n-butyl mercaptan, iso-butyl mercaptan, sec-butyl mercaptan, tert-butyl mercaptan, amyl mercaptan, and mixtures thereof. Examples of the thioethers include dimethyl thioether, methylethyl thioether, diethyl thioether, methyl-iso-propyl thioether, and mixtures thereof. Examples of the amines include pyridine, α-picoline, β-picoline, γ-picoline, and mixtures thereof.

The fragrances may be aliphatic or cyclic aliphatic ethers, aromatic ethers, aliphatic or cyclic aliphatic alcohols, aromatic alcohols, alkyl sulfides, aliphatic or aromatic nitriles, terpene hydrocarbons, benzene hydrocarbons, ketones, esters, phenols, lactones, diketones, or mixtures thereof. Examples of the aliphatic or cyclic aliphatic ethers include cionel, isoamyl butyl ether, citronellal dimethyl acetal, geranyl methyl ether, α-cedrene epoxide, cedrol methyl ether, and mixtures thereof. Examples of the aromatic ethers include diphenyl oxide, dihydroanethol, 1-phenyl-2(1'-ethoxy)ethoxyethane, isobutyl benzyl ether, propyl phenyl ethyl ether, methyl chavicol, para-cresyl benzyl ether, 1,3,4,6,7,8-hexahydro-4,6,6,7,8,8-hexamethyl-cycropenta-γ-2-benzopyran, and mixtures thereof. Examples of the aliphatic or cyclic aliphatic alcohols include diisobutyl carbinol, dihydro-α-terepineol, linalool, tetrahydro linalool, normal hexanol, cis-3-hexanol-1, fenchol, 3,7-dimetyl-octanol-1, α-terepineol, borneol, and mixtures thereof. Examples of the aromatic alcohols include phenyl dimethyl carbinol, benzyl alcohol, phenyl ethyl alcohol, cinnamyl alcohol, para-hydroxy methyl cumene, and mixtures thereof. Examples of the alkyl sulfides include dimethyl sulfide, dipropyl sulfide, and mixtures thereof. Examples of the aliphatic or aromatic nitriles include dimethylcyclohexene nitrile, 2,3-dimethyl-2-nonene nitrile, decane nitrile, geranyl nitrile, 2,4,5-trimethyl benzonitrile, 4-phenyl butyronitrile, 3-phenyl propionitrile, para-methoxy benzonitrile, and mixtures thereof. Examples of the terpene hydrocarbons include α-pinene, dipentene, β-caryophyllene, longifolene, cedrene, camphene, $\Delta^3$-carene, and mixtures thereof. Examples of the benzene hydrocarbons include para-cymene, 1-methylnaphthalene, 2-methylnaphthalene, cumene, and mixtures thereof. Examples of the ketones include 2-octanone, amyl phenyl ketone, diphenyl ketone, benzyl acetone, menthone, carvone, para-tertiary-butyl cyclohexanone, methyl heptanone, and mixtures thereof. Examples of the esters include diethyl phthalate, hexyl hexanoate, methyl-2-octynoate, benzyl propionate, isobornyl acetate, para-tertiary-butyl cyclohexyl acetate, and mixtures thereof. Examples of the phenols include thymol, guaiacol, eugenol, para-ethyl phenol, methyl salicylate, chavicol, creosol, and mixtures thereof. Examples of the lactones include 3-normal-butylidenephthalide, 3-normal-butylphthalide, 15-hydroxypentadecanoic lactone, δ-decalactone, γ-hexalactone, and mixtures thereof. Examples of the diketones include 5-ethyl-3-hydroxy-4-methyl-2(5H-furanone), 3-methyl-1,2-cyclohexanedione, 3-ethylcyclopentanedione, and mixtures thereof.

(1-1) Outdoor Unit 2

The outdoor unit 2 is connected to the indoor unit 50 through the liquid refrigerant transfer pipe 6 and the gas refrigerant transfer pipe 7, and it constitutes part of the refrigeration circuit 10. The outdoor unit 2 mainly includes a compressor 21, a four-way switching valve 22, an outdoor heat exchanger 23, an outdoor expansion valve 24, an outdoor fan 25, a liquid-side closing valve 29, and a gas-side closing valve 30.

The outdoor unit 2 further includes a discharge pipe 31, a suction pipe 34, an outdoor gas-side piping 33, and an outdoor liquid-side piping 32, which constitute the refrigeration circuit 10. The discharge pipe 31 connects the discharge side of the compressor 21 and a first connection port of the four-way switching valve 22. The suction pipe 34 connects the suction side of the compressor 21 and a second connection port of the four-way switching valve 22. The outdoor gas-side piping 33 connects a third connection port of the four-way switching valve 22 and the gas-side closing valve 30. The outdoor liquid-side piping 32 extends from a fourth connection port of the four-way switching valve 22 up to the liquid-side closing valve 29 through the outdoor heat exchanger 23 and the outdoor expansion valve 24.

The compressor 21 compresses the refrigerant at low pressure in the refrigeration cycle up to high pressure. Here, the compressor 21 is constituted as a compressor of closed structure in which a displacement compression element (not illustrated), such as a rotary or scroll type, is driven and rotated by a compressor motor M21. The compressor motor M21 is to change the capacity, and its operation frequency can be controlled by an inverter.

By selectively changing a connected state, the four-way switching valve 22 can switch over a cooling-operation connected state in which the discharge side of the compressor 21 is connected to the outdoor heat exchanger 23 and the suction side of the compressor 21 is connected to the gas-side closing valve 30, and a heating-operation connected state in which the discharge side of the compressor 21 is connected to the gas-side closing valve 30 and the suction side of the compressor 21 is connected to the outdoor heat exchanger 23.

The outdoor heat exchanger 23 is a heat exchanger functioning as a radiator for the refrigerant at high pressure in the refrigeration cycle during the cooling operation and as an evaporator for the refrigerant at low pressure in the refrigeration cycle during the heating operation.

The outdoor fan 25 sucks outdoor air into the outdoor unit 2 and generates an air flow to be exhausted to the outside after heat exchange of the sucked air with the refrigerant in the outdoor heat exchanger 23. The outdoor fan 25 is driven and rotated by an outdoor fan motor M25.

The outdoor expansion valve 24 is an electrically-operated expansion valve capable of controlling a valve opening and is disposed midway the outdoor liquid-side piping 32 at a position between the outdoor heat exchanger 23 and the liquid-side closing valve 29.

The liquid-side closing valve 29 is a manual valve disposed at a junction between the outdoor liquid-side piping 32 and the liquid refrigerant transfer pipe 6.

The gas-side closing valve 30 is a manual valve disposed at a junction between the outdoor gas-side piping 33 and the gas refrigerant transfer pipe 7.

Various sensors are disposed in the outdoor unit 2.

More specifically, around the compressor 21 of the outdoor unit 2, there are disposed a suction temperature sensor 35 for detecting a temperature of the refrigerant on the suction side of the compressor 21, a suction pressure sensor 36 for detecting a suction pressure that is a pressure of the refrigerant on the suction side of the compressor 21, and a discharge pressure sensor 37 for detecting a discharge pressure that is a pressure of the refrigerant on the discharge side of the compressor 21.

Furthermore, the outdoor heat exchanger 23 includes an outdoor heat exchange temperature sensor 38 for detecting a temperature of the refrigerant flowing in the outdoor heat exchanger 23.

In addition, an outdoor air temperature sensor 39 for detecting a temperature of the outdoor air sucked into the outdoor unit 2 is disposed around the outdoor heat exchanger 23 or the outdoor fan 25.

The outdoor unit 2 includes an outdoor unit controller 20 for controlling operations of various components constituting the outdoor unit 2. The outdoor unit controller 20 includes a microcomputer including a CPU, a memory, etc. The outdoor unit controller 20 is connected to an indoor unit controller 57 of the indoor unit 50 via a communication line for sending and receiving control signals, etc. Moreover, the outdoor unit controller 20 is electrically connected to each of the suction temperature sensor 35, the suction pressure sensor 36, the discharge pressure sensor 37, the outdoor heat exchange temperature sensor 38, and the outdoor air temperature sensor 39, and it receives a signal from each sensor.

(1-2) Indoor Unit 50

The indoor unit 50 is installed on, for example, a wall surface or a ceiling of a room, i.e., a target space. The indoor unit 50 is connected to the outdoor unit 2 through the liquid refrigerant transfer pipe 6 and the gas refrigerant transfer pipe 7, and it constitutes part of the refrigeration circuit 10.

The indoor unit 50 includes an indoor expansion valve 54, an indoor heat exchanger 52, and an indoor fan 53.

The indoor unit 50 further includes an indoor liquid refrigerant pipe 58 connecting the liquid-side end of the indoor heat exchanger 52 and the liquid refrigerant transfer pipe 6, and an indoor gas refrigerant pipe 59 connecting the gas-side end of the indoor heat exchanger 52 and the gas refrigerant transfer pipe 7.

The indoor expansion valve 54 is an electrically-operated expansion valve capable of controlling a valve opening and is disposed midway the indoor liquid refrigerant pipe 58.

The indoor heat exchanger 52 is a heat exchanger functioning as an evaporator for the refrigerant at low pressure in the refrigeration cycle during the cooling operation and as a radiator for the refrigerant at high pressure in the refrigeration cycle during the heating operation.

The indoor fan 53 sucks indoor air into the indoor unit 50 and generates an air flow to be exhausted to the outside after heat exchange of the sucked air with the refrigerant in the indoor heat exchanger 52. The indoor fan 53 is driven and rotated by an indoor fan motor M53.

Various sensors are disposed in the indoor unit 50.

More specifically, inside the indoor unit 50, there are disposed a refrigerant gas sensor 81 for, when a refrigerant gas charged in the refrigeration circuit 10 leaks, detecting a concentration of the leaked refrigerant, an air temperature sensor 82 for detecting an air temperature in a space where the indoor unit 50 is installed, and an indoor heat exchange temperature sensor 83 for detecting a temperature of the refrigerant flowing in the indoor heat exchanger 52.

The indoor unit 50 includes an indoor unit controller 57 for controlling operations of various components constituting the indoor unit 50. The indoor unit controller 57 includes a microcomputer including a CPU, a memory, etc. The indoor unit controller 57 is connected to the outdoor unit controller 20 of the outdoor unit 20 via a communication line for sending and receiving control signals, etc.

In addition, the indoor unit controller 57 is electrically connected to each of the refrigerant gas sensor 81, the air temperature sensor 82, and the indoor heat exchange temperature sensor 83, and it receives a signal from each sensor.

(1-3) Remote Controller 50a

The remote controller 50a is an input device through which a user of the indoor unit 50 inputs various commands for changing the operation state of the air conditioner 100. The remote controller 50a further functions as an output device for notifying the operation state of the air conditioner 100 and predetermined information. The remote controller 50a is connected to the indoor unit controller 57 via a communication line for sending and receiving signals therebetween. A speaker is built in the remote controller 50a.

(2) Details of Controller 70

In the air conditioner 100, the outdoor unit controller 20 and the indoor unit controller 57 are connected via a communication line to constitute the controller 70 for controlling the operation of the air conditioner 100.

Figure 2:
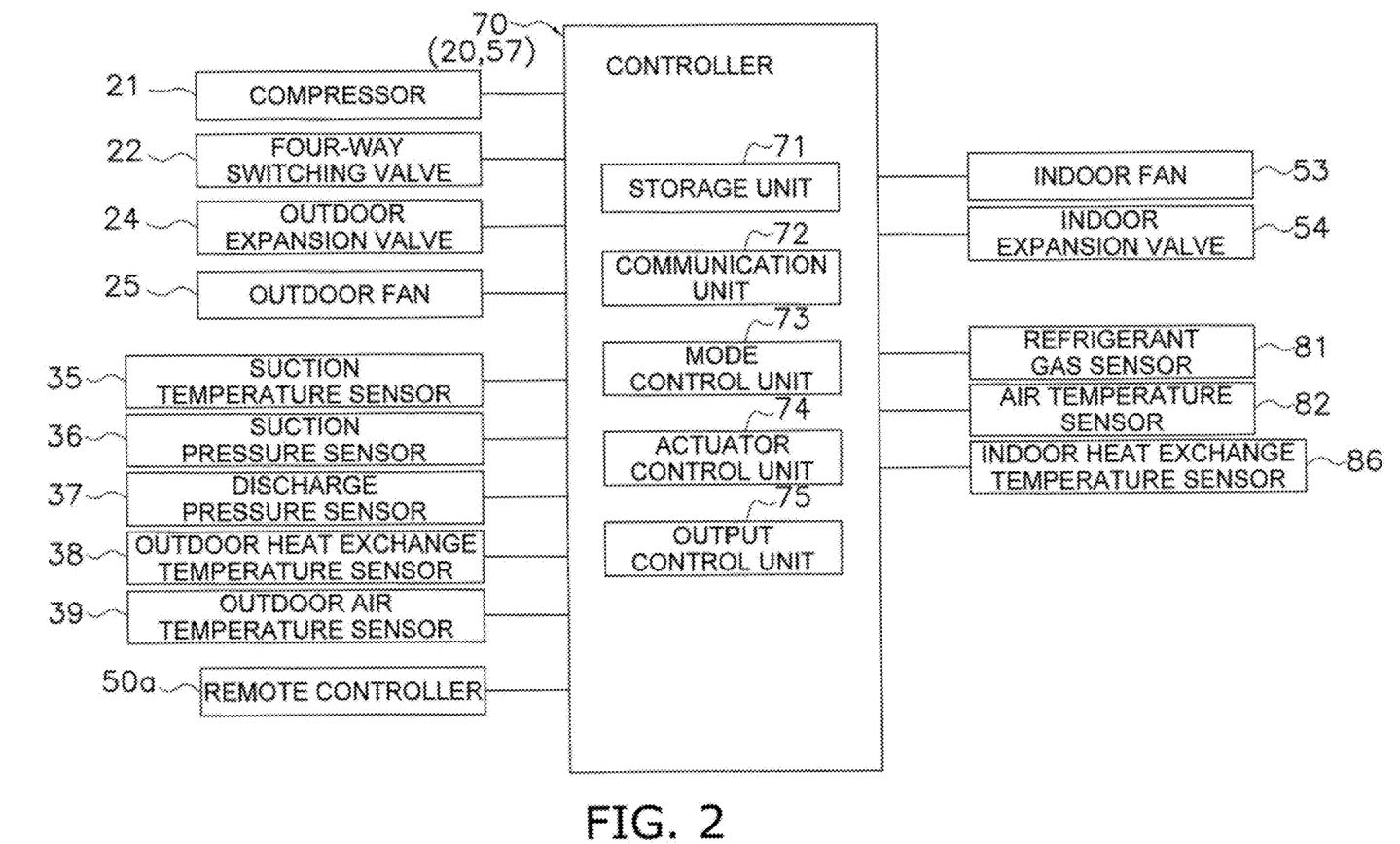
FIG. 2 is a block diagram illustrating a schematic configuration of a controller and individual components connected to the controller.

FIG. 2 is a block diagram illustrating a schematic configuration of the controller 70 and individual components connected to the controller 70.

The controller 70 has a plurality of control modes and controls the operation of the air conditioner 100 depending on the control mode. For example, the controller 70 has, as the control modes, a normal operation mode executed in a normal case and a refrigerant leak control mode executed in the event of the refrigerant leak.

The controller 70 is electrically connected to individual actuators (specifically, the compressor 21 (compressor motor M21), the outdoor expansion valve 24, and the outdoor fan 25 (outdoor fan motor M25), and individual sensors (such as the suction temperature sensor 35, the suction pressure sensor 36, the discharge pressure sensor 37, the outdoor heat exchange temperature sensor 38, and the outdoor air temperature sensor 39), those actuators and sensors being included in the outdoor unit 2. The controller 70 is further electrically connected to individual actuators (specifically, the indoor fan 53 (indoor fan motor M53) and the indoor expansion valve 54), which are included in the indoor unit 50. In addition, the controller 70 is electrically connected to the refrigerant gas sensor 81, the air temperature sensor 82, the indoor heat exchange temperature sensor 83, and the remote controller 50a.

The controller 70 mainly includes a storage unit 71, a communication unit 72, a mode control unit 73, an actuator control unit 74, and an output control unit 75. Those units in the controller 70 are realized with the individual units, which are included in the outdoor unit controller 20 and/or the indoor unit controller 57, functioning in a manner as incorporated in one controller.

(2-1) Storage Unit 71

The storage unit 71 is constituted by, for example, ROM, RAM, a flash memory, etc., and it includes a volatile storage area and a non-volatile storage area. The storage unit 71 stores control programs that define processes to be executed in the individual units of the controller 70. Furthermore, in the storage unit 71, predetermined items of information (such as detected values of the individual sensors and commands input through the remote controller 50a) are stored in predetermined storage areas as appropriate from the individual units of the controller 70.

(2-2) Communication Unit 72

The communication unit 72 is a function unit serving as a communication interface that sends and receives signals to and from the individual devices connected to the controller 70. The communication unit 72 receives a request from the actuator control unit 74 and sends a predetermined signal to a designated actuator. Moreover, the communication unit 72 receives signals output from the individual sensors 35 to 39 and 81 to 83 and the remote controller 50a, and stores the received signals in predetermined storage areas of the storage unit 71.

(2-3) Mode Control Unit 73

The mode control unit 73 is a function unit for, for example, changing the control mode. When a predetermined refrigerant leak condition is not satisfied in any part of the indoor unit 50, the mode control unit 73 sets the control mode to the normal operation mode.

On the other hand, when the predetermined refrigerant leak condition is satisfied in the indoor unit 50, the mode control unit 73 changes the control mode to the refrigerant leak control mode.

(2-4) Actuator Control Unit 74

The actuator control unit 74 controls the operations of the individual actuators (such as the compressor 21), which are included in the air conditioner 100, depending on situations in accordance with the control programs.

In the normal operation mode, for example, the actuator control unit 74 controls the rotation speed of the compressor 21, the rotation speeds of the outdoor fan 25 and the indoor fan 53, the valve opening of the outdoor expansion valve 24, the valve opening of the indoor expansion valve 54, etc. in real time depending on the setting temperature, the detected values of the various sensors, etc.

In the refrigerant leak control mode, the actuator control unit 74 controls the operations of the individual actuators such that a predetermined operation is performed. More specifically, in the event of the refrigerant leak, the actuator control unit 74 suppresses supply of the refrigerant to the indoor unit 50.

(2-5) Output Control Unit 75

The output control unit 75 is a function unit for controlling the operation of the remote controller 50a that serves as a display unit.

The output control unit 75 outputs predetermined information to the remote controller 50a in order that information regarding the operation state and the situations are displayed to an administrator.

During execution of a cooling operation mode in the normal operation mode, for example, the output control unit 75 makes control to display various items of information, such as the setting temperature, on the remote controller 50a.

In the refrigerant leak control mode, the output control unit 75 makes control to display information indicating the occurrence of the refrigerant leak on a display of the remote controller 50a. Moreover, the output control unit 75 notifies the occurrence of the refrigerant leak by voice through a speaker built in the remote controller 50a. In addition, the output control unit 75 displays information prompting notification to a service engineer on the remote controller 50a.

(3) Normal Operation Mode

The normal operation mode will be described below.

A cooling operation mode and a heating operation mode are prepared as the normal operation mode.

In accordance with the command received from the remote controller 50a, for example, the controller 70 determines whether the cooling operation mode or the heating operation mode is to be executed, and executes the operation in the determined mode.

(3-1) Cooling Operation Mode

In the air conditioner 100, the cooling operation mode is performed in such a manner that the connected state of the four-way switching valve 22 is set to the cooling-operation connected state in which the discharge side of the compressor 21 is connected to the outdoor heat exchanger 23 and the suction side of the compressor 21 is connected to the gas-side closing valve 30, and that the refrigerant filled in the refrigeration circuit 10 is circulated in the order of mainly the compressor 21, the outdoor heat exchanger 23, the outdoor expansion valve 24, the indoor expansion valve 54, and the indoor heat exchanger 52.

More specifically, when the cooling operation mode is started, the refrigerant in the refrigeration circuit 10 is sucked into the compressor 21 and then discharged after being compressed. Here, low pressure in the refrigeration cycle is given as the suction pressure detected by the suction pressure sensor 36, and high pressure in the refrigeration cycle is given as the discharge pressure detected by the discharge pressure sensor 37.

In the compressor 21, capacity control is performed depending on a cooling load demanded in the indoor unit 50. More specifically, a target value of the suction pressure is set depending on the cooling load demanded in the indoor unit 50, and the operation frequency of the compressor 21 is controlled such that the suction pressure is held at the target value.

The gas refrigerant discharged from the compressor 21 flows into the gas-side end of the outdoor heat exchanger 23 through the discharge pipe 31 and the four-way switching valve 22.

The gas refrigerant having flowed into the gas-side end of the outdoor heat exchanger 23 radiates heat in the outdoor heat exchanger 23 through heat exchange with the outdoor air supplied by the outdoor fan 25, and is condensed to the liquid refrigerant that flows out from the liquid-side end of the outdoor heat exchanger 23.

The liquid refrigerant having flowed out from the liquid-side end of the outdoor heat exchanger 23 flows into the indoor unit 50 through the outdoor liquid-side piping 32, the outdoor expansion valve 24, the liquid-side closing valve 29, and the liquid refrigerant transfer pipe 6. In the cooling operation mode, the outdoor expansion valve 24 is controlled to be held in a fully-opened state.

The refrigerant having flowed into the indoor unit 50 flows into the indoor expansion valve 54 through part of the indoor liquid refrigerant pipe 58. The refrigerant having flowed into the indoor expansion valve 54 is depressurized by the indoor expansion valve 54 to the low pressure in the refrigeration cycle, and then flows into the liquid-end side of the indoor heat exchanger 52. In the cooling operation mode, the valve opening of the indoor expansion valve 54 is controlled such that a degree of superheat of the refrigerant sucked into the compressor 21 is held at a predetermined value. Here, the degree of superheat of the refrigerant sucked into the compressor 21 is calculated by the controller 70 using the detected temperature of the suction temperature sensor 35 and the detected pressure of the suction pressure sensor 36. The refrigerant having flowed into the liquid-end side of the indoor heat exchanger 52 is evaporated into the gas refrigerant in the indoor heat exchanger 52 through heat exchange with the indoor air supplied by the indoor fan 53, and the gas refrigerant flows out from the gas-side end of the indoor heat exchanger 52. The gas refrigerant having flowed out from the gas-side end of the indoor heat exchanger 52 flows into the gas refrigerant transfer pipe 7 through the indoor gas refrigerant pipe 59.

Thus, the refrigerant flows through the gas refrigerant transfer pipe 7 and is sucked into the compressor 21 again through the gas-side closing valve 30, the outdoor gas-side piping 33, the four-way switching valve 22, and the suction pipe 34.

(3-2) Heating Operation Mode

In the air conditioner 100, the heating operation mode is performed in such a manner that the connected state of the four-way switching valve 22 is set to the heating-operation connected state in which the discharge side of the compressor 21 is connected to the gas-side closing valve 30 and the suction side of the compressor 21 is connected to the outdoor heat exchanger 23, and that the refrigerant filled in the refrigeration circuit 10 is circulated in the order of mainly the compressor 21, the indoor heat exchanger 52, the indoor expansion valve 54, the outdoor expansion valve 24, and the outdoor heat exchanger 23.

More specifically, when the heating operation mode is started, the refrigerant in the refrigeration circuit 10 is sucked into the compressor 21 and then discharged after being compressed. Here, the low pressure in the refrigeration cycle is given as the suction pressure detected by the suction pressure sensor 36, and the high pressure in the refrigeration cycle is given as the discharge pressure detected by the discharge pressure sensor 37.

In the compressor 21, capacity control is performed depending on a heating load demanded in the indoor unit 50. More specifically, a target value of the discharge pressure is set depending on the heating load demanded in the indoor unit 50, and the operation frequency of the compressor 21 is controlled such that the discharge pressure is held at the target value.

The gas refrigerant discharged from the compressor 21 flows through the discharge pipe 31, the four-way switching valve 22, the outdoor gas-side piping 33, and the gas refrigerant transfer pipe 7, and then flows into the indoor unit 50 through the indoor gas refrigerant pipe 59.

The refrigerant having flowed into the indoor unit 50 flows into the gas-side end of the indoor heat exchanger 52 through the indoor gas refrigerant pipe 59. The refrigerant having flowed into the gas-end side of the indoor heat exchanger 52 radiates heat in the indoor heat exchanger 52 through heat exchange with the indoor air supplied by the indoor fan 53, and is condensed to the liquid refrigerant that flows out from the liquid-side end of the indoor heat exchanger 52. The refrigerant having flowed out from the liquid-side end of the indoor heat exchanger 52 flows into the liquid refrigerant transfer pipe 6 through the indoor liquid refrigerant pipe 58 and the indoor expansion valve 54.

In the heating operation mode, the valve opening of the indoor expansion valve 54 is controlled to be held in a fully-opened state.

Thus, the refrigerant flows through the liquid refrigerant transfer pipe 6 and flows into the outdoor expansion valve 24 through the liquid-side closing valve 29 and the outdoor liquid-side piping 32.

The refrigerant having flowed into the outdoor expansion valve 24 is depressurized to the low pressure in the refrigeration cycle, and then flows into the liquid-end side of the outdoor heat exchanger 23. In the heating operation mode, the valve opening of the outdoor expansion valve 24 is controlled such that a degree of superheat of the refrigerant sucked into the compressor 21 is held at a predetermined value.

The refrigerant having flowed into the outdoor heat exchanger 23 from the liquid-end side is evaporated into the gas refrigerant in the outdoor heat exchanger 23 through heat exchange with the outdoor air supplied by the outdoor fan 25, and the gas refrigerant flows out from the gas-side end of the outdoor heat exchanger 23.

The refrigerant having flowed out from the gas-side end of the outdoor heat exchanger 23 is sucked into the compressor 21 again through the four-way switching valve 22 and the suction pipe 34.

(4) Refrigerant Leak Control Mode

Figure 3:
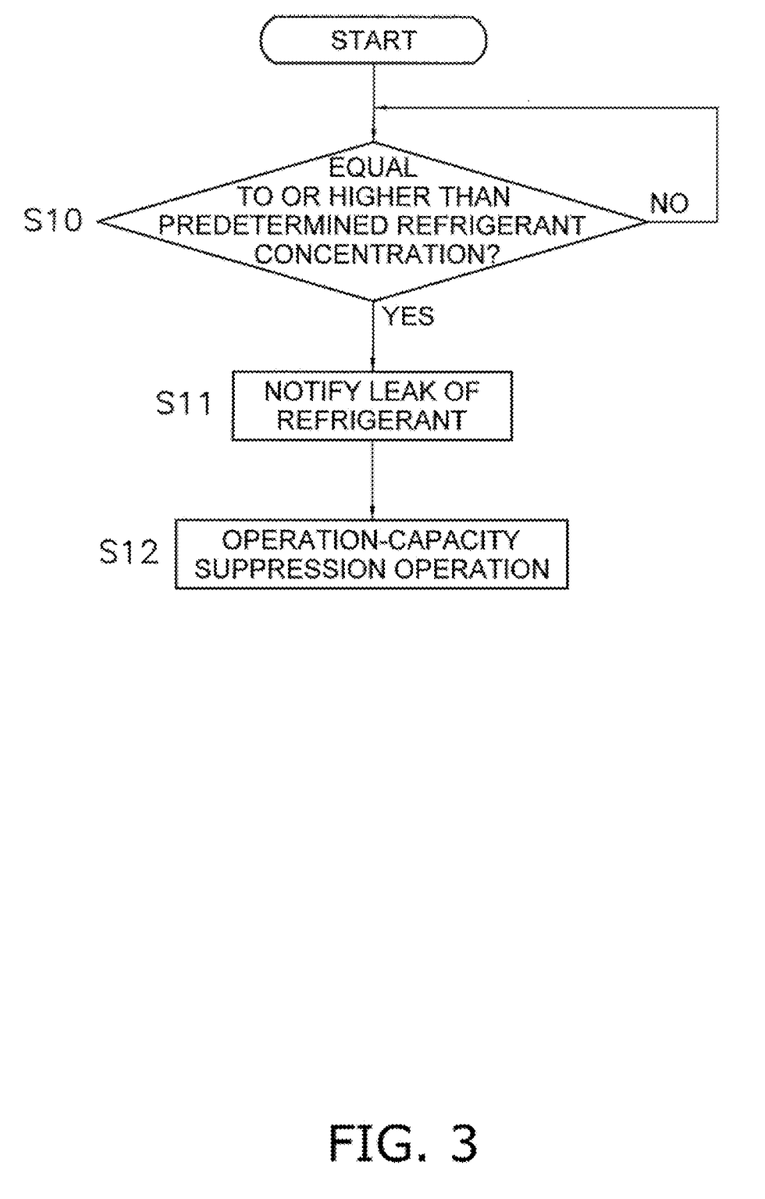
FIG. 3 is a flowchart illustrating an example of a sequence of processing steps executed by the controller in a refrigerant leak control mode.

An example of a processing flow in the refrigerant leak control mode executed by the controller 70 when refrigerant leak has occurred during the normal operation mode will be described below with reference to a flowchart of FIG. 3.

In Step S10, when the normal operation mode is executed as the cooling operation mode or the heating operation mode, the controller 70 determines whether the concentration of the refrigerant detected by the refrigerant gas sensor 81 is equal to or higher than a predetermined refrigerant concentration. The predetermined refrigerant concentration is previously set depending on the type (R32 in this embodiment) of the refrigerant charged in the refrigeration circuit 10, and is stored in the storage unit 71. If the controller 70 determines that the concentration of the refrigerant detected by the refrigerant gas sensor 81 is equal to or higher than the predetermined refrigerant concentration, the controller 70 goes to Step S11. On the other hand, if the concentration of the refrigerant detected by the refrigerant gas sensor 81 is lower than the predetermined refrigerant concentration, the normal operation mode is continued and Step S10 is repeated.

In Step S11, the controller 70 starts the refrigerant leak control mode and instructs the output control unit 75 to display the information indicating the occurrence of the refrigerant leak on the display of the remote controller 50a. Moreover, the controller 70 instructs the output control unit 75 to notify the occurrence of the refrigerant leak as voice information through the speaker of the remote controller 50a.

In Step S12, the controller 70 executes an operation-capacity suppression operation for reducing the driving frequency of the compressor 21 from the current frequency. This operation can reduce an amount of the refrigerant circulating in the refrigeration circuit 10 and can reduce the leak of the refrigerant from a leak location.

(5) Search for Refrigerant Leak Location

A searcher, for example, a user or an administrator of the equipment in which the air conditioner 100 is installed, who has recognized the occurrence of the refrigerant leak by the notification from the remote controller 50a, searches the refrigerant leak location by using, as detection means, a dog trained to respond to an odor component of an odorant.

The dog is trained to bark at a location at which a concentration of the odor component of the odorant is high (e.g., a location at which the concentration is higher than a predetermined value sensible by the dog) while running. Preferably, the dog is trained not to bark during the search under a situation that a location at which the concentration of the odor component is maximal is not yet searched. Here, the searcher may search for the refrigerant leak location along the refrigeration circuit 10 together with the dog, or may let only the dog to search if the dog is trained to be able to run alone along the refrigeration circuit 10.

When the refrigerant leak location has been detected by the above-described search, the searcher stops the operation of the air conditioner 100.

(6) Features

In the method of searching for the refrigerant leak location according to this embodiment, the odorant is mixed into the refrigerant that is filled in the refrigeration circuit 10. In the event of the refrigerant leak, a dog with a much better sense of smell than humans is used as the detection means. In this embodiment, particularly, the dog trained to be able to respond to the odorant mixed in the refrigerant is used.

Therefore, the refrigerant leak location can be more precisely specified than the case in which humans search for the refrigerant leak location. Furthermore, when the dog searches for the refrigerant leak location with its sense of smell while running, the refrigerant leak location can be more quickly specified than the case in which humans search for the refrigerant leak location with his or her sense of smell. Moreover, the dog can specify the refrigerant leak location in a shorter time than the case in which humans move to search for the refrigerant leak location while carrying a leak detector for electrically detecting the refrigerant concentration.

The dog is able to determine the odor of the refrigerant itself (R32 in this embodiment). However, by additionally using the odorant, it is possible to make the dog more easily specify the refrigerant leak location.

(7) Modifications

The above embodiment can be appropriately modified as represented by the following modifications. Each of the modifications may be implemented in combination with one or more of the other modifications.

(7-1) Modification A

The above embodiment has been described, by way of example, in connection with the case of using R32 as the refrigerant charged in the refrigeration circuit 10.

However, the refrigerant charged in the refrigeration circuit 10 is not limited to R32. As other usable refrigerants except for R32, there are, for example, a flammable refrigerant classified as A3 in accordance with the refrigerant safety classification standards of ASHRAE34, a low flammable refrigerant classified as A2 in accordance with the refrigerant safety classification standards of ASHRAE34, a very low flammable refrigerant classified as A2L in accordance with the refrigerant safety classification standards of ASHRAE34, and a highly toxic refrigerant classified as B in accordance with the refrigerant safety classification standards of ASHRAE34. The case of using such a refrigerant can also provide similar advantageous effects to those obtained in the above embodiment.

A refrigerant having a lower GWP value than R32 (e.g., a natural refrigerant such as R717 and, R170, R1270, R290, R600 or R600a, R152a, or a mixed refrigerant of the formers) may also be used as the refrigerant other than R32, which is to be charged in the refrigeration circuit 10. Even in the case of using such a refrigerant having a relatively low GWP value, since the refrigerant leak location can be quickly specified, it is possible to quickly start repair work, etc. which are needed after specifying the leak location.

The above embodiment has been described, regarding the case of using a dog as the detection means, in connection with the example in which the odorant is mixed in the refrigerant charged in the refrigeration circuit 10. However, when the dog can sufficiently determine the odor of the refrigerant itself, which is used in Modification A, with its sense of smell, the odorant is not always required to be mixed into the refrigerant. In that case, the dog is let to determine the odor component contained in the refrigerant itself instead of the odor component of the odorant. Mixing the odorant into the refrigerant is particularly meaningful when the odor of the refrigerant itself is weak.

(7-2) Modification B

The above embodiment has been described, by way of example, in connection with the case of starting the search for the refrigerant leak location by using the detection means when the occurrence of the refrigerant leak has been notified by the controller 70 through the remote controller 50*a*.

However, the timing of searching for the refrigerant leak location is not limited to a period after the occurrence of the refrigerant leak has been clearly found, and the search for the refrigerant leak may be performed even under a situation that the occurrence of the refrigerant leak is unclear. For example, as a periodic inspection or a simple inspection for the equipment in which the air conditioner 100 is installed, or as an inspection after a disaster such as an earthquake or a fire, the search for the refrigerant leak may be performed under the situation that the occurrence of the refrigerant leak is unclear.

Examples of those inspections include a periodic inspection or a simple inspection in accordance with CFC Emission Control Act.

(7-3) Modification C

The above embodiment has been described, by way of example, in connection with the case of using a dog as the detection means.

However, a self-propelled device, i.e., a robot, may be used to detect the refrigerant leak location.

Figure 4:
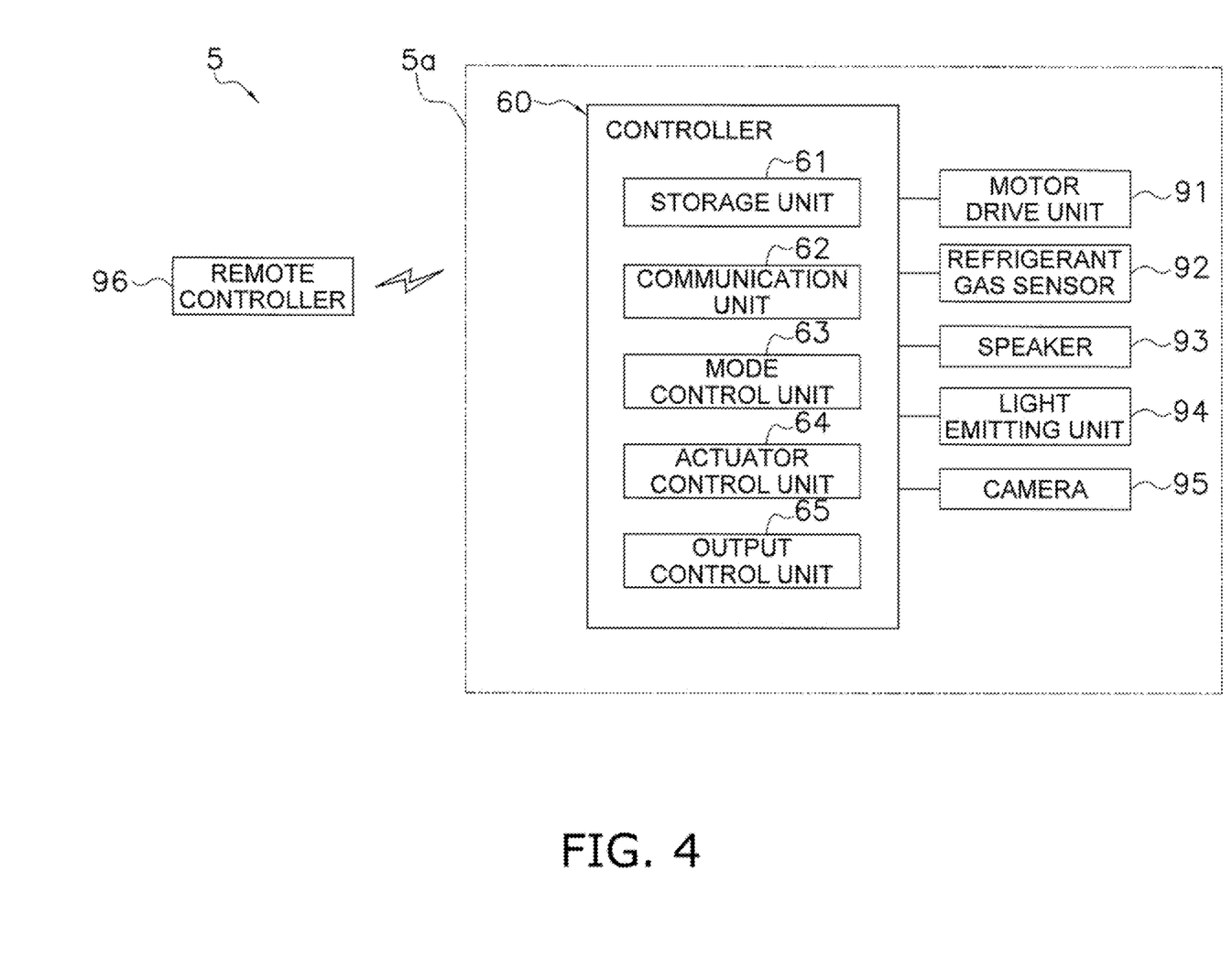
FIG. 4 is a block diagram of a self-propelled device according to a modification C.

As illustrated in FIG. 4, for example, the self-propelled device may be a self-propelled device 5 including a motor drive unit 91, a refrigerant gas sensor 92, a controller 60, a speaker 93, a light emitting unit 94, and a camera 95, which are disposed inside a housing 5*a*, as well as a remote controller 96 outside the housing 5*a*.

The motor drive unit 91 is a structural body utilizing motor power to move the self-propelled device 5 in a desired direction. The motor drive unit 91 includes, though not illustrated, a motor, a chassis, wheels, tires, etc. and is disposed inside the housing 5*a*. The motor drive unit 91 is controlled by the controller 60, which receives an operation command from the remote controller 96 operated by the user, such that a moving direction, a moving speed, etc. can be adjusted. The self-propelled device 5 is preferably a flying vehicle, such as a drone, which has a propeller driven by the motor drive unit 91 and which can fly, from the viewpoint of enabling the search to be performed for the refrigerant leak location present even at a high position remote from a floor surface.

The refrigerant gas sensor 92 is disposed inside the housing 5*a* and detects the concentration of the leaked refrigerant in air in the event of leak of the refrigerant charged in the refrigeration circuit 10. A detection method of the refrigerant gas sensor 92 is not limited to particular one, and it may be, for example, a semiconductor method, an infrared absorption spectroscopic method, a non-dispersive infrared absorption method, or an electrochemical method. Preferably, one among those detection methods, which has high detection accuracy for the type of the refrigerant charged in the refrigeration circuit 10, is selected.

The speaker 93 is disposed inside the housing 5a and notifies the finding of the refrigerant leak location and the presence position of the self-propelled device 5 by outputting voice. Thus, the user can recognize the presence position of the self-propelled device 5 based on a source outputting the voice.

The light emitting unit 94 is an LED light bulb disposed inside the housing 5a and notifies the finding of the refrigerant leak location and the presence position of the self-propelled device 5 by outputting light. Thus, the user can recognize the presence position of the self-propelled device 5 based on a source outputting the light.

The camera 95 is disposed inside the housing 5a and can take photos of the leak location and the surroundings under control of the controller 60 that receives a command from the remote controller 96.

The remote controller 96 is disposed as a separate unit outside the housing 5a and is constituted to be able to wirelessly communicate with a communication unit 62 of the controller 60. Furthermore, the remote controller 96 receives various operation commands regarding the self-propelled device 5 from the user and sends the operation commands to the communication unit 62 of the controller 60.

The controller 60 is disposed inside the housing 5a. The controller 60 has a plurality of control modes and controls the self-propelled device 5 depending on each of the control modes. Here, the controller 60 has, as the control modes, a search mode of searching for the refrigerant leak location and a notification mode of notifying the finding of the refrigerant leak location.

The controller 60 is electrically connected to the motor drive unit 91, the refrigerant gas sensor 92, the speaker 93, the light emitting unit 94, and the camera 95, and it includes a storage unit 61, a communication unit 62, a mode control unit 63, an actuator control unit 64, an output control unit 65, etc.

The storage unit 61 is constituted by, for example, ROM, RAM, a flash memory, etc. and it includes a volatile storage area and a non-volatile storage area. The storage unit 61 stores control programs that define processes to be executed in the individual units of the controller 60. Furthermore, in the storage unit 61, predetermined items of information (such as a detected value of the refrigerant gas sensor 92 and commands input through the remote controller 96) are stored in predetermined storage areas as appropriate from the individual units of the controller 60.

The communication unit 62 is a function unit serving as a communication interface that sends and receives signals to and from the individual devices connected to the controller 60. The communication unit 62 receives a request from the actuator control unit 64 and sends a predetermined signal to a designated actuator. Furthermore, the communication unit 62 receives signals output from the refrigerant gas sensor 92 and the remote controller 96, and stores the received signals in predetermined storage areas of the storage unit 61.

The mode control unit 63 is a function unit for, for example, changing the control mode. The mode control unit 63 executes the search mode when the refrigerant leak location is to be searched, and the notification mode when the finding of the refrigerant leak location is to be notified.

The actuator control unit 64 controls the operations of the individual actuators (such as the motor drive unit 91 and the camera 95), which are included in the self-propelled device 5, depending on situations in accordance with the control programs.

The output control unit 65 is a function unit for controlling the notifications issued by the speaker 93 and/or the light emitting unit 94.

Figure 5:
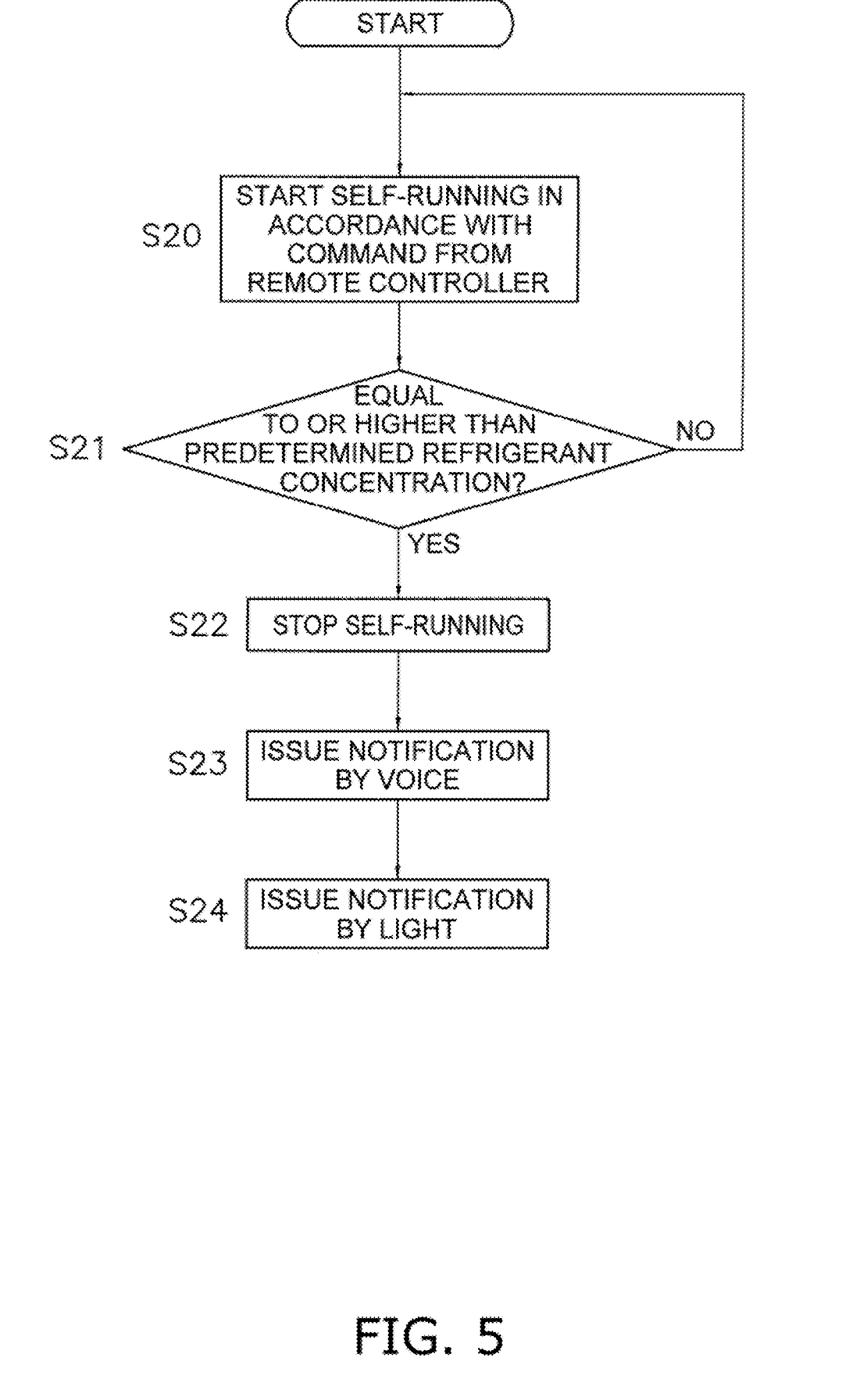
FIG. 5 is a flowchart illustrating an example of a sequence of processing steps executed by the controller in the case of searching for a refrigerant leak location by the self-propelled device according to the modification C.

An example of a flow of processing executed by the controller 60 will be described below with reference to a flowchart of FIG. 5.

First, in Step S20, the controller 60 executes the search mode. Upon receiving an operation signal from the remote controller 96, the controller 60 controls the motor drive unit 91 to start self-running of the self-propelled device 5. Here, the user operates the remote controller 96 and causes the self-propelled device 5 to move along the refrigeration circuit 10. The user can let the self-propelled device 5 to move in, for example, a space between floors of a building or a space behind the ceiling.

In Step S21, the controller 60 determines whether the concentration of the refrigerant detected by the refrigerant gas sensor 92 is equal to or higher than a predetermined refrigerant concentration. If the controller 60 determines that the detected refrigerant concentration is equal to or higher than the predetermined refrigerant concentration, the controller 60 goes to Step S22. If the detected refrigerant concentration is lower than the predetermined refrigerant concentration, the controller 60 returns to Step S20 and repeats the same.

In Step S22, the controller 60 ceases the driving of the motor drive unit 91 to stop the self-running of the self-propelled device 5. After ending the search mode, the controller 60 goes to Step S23.

In Step S23, the controller 60 executes the notification mode and outputs predetermined voice from the speaker, thus issuing the notification by voice.

In Step S24, the controller 60 instructs the light emitting unit 94 to output predetermined light (light-up or blinking), thus issuing the notification by light.

The self-propelled device 5 stops the self-running to halt at a location where the concentration of the leaked refrigerant is high, and issues the notifications by voice and light at the halted position. As a result, the user can recognize the refrigerant leak location. In particular, because the self-propelled device 5 can perform the search by approaching the refrigerant leak location by itself instead of humans, the refrigerant leak location can be searched with less possibility of posing harm on a human body even when a toxic refrigerant or a flammable refrigerant is used in the refrigeration circuit 10.

While the above description has been made, by way of example, in connection with the case in which the remote controller 96 is connected to be able to perform wireless communication, the remote controller 96 may be connected to a body of the self-propelled device 5 to be able to perform wired communication.

While the above description has been made, by way of example, in connection with the case in which the notifications by voice and light are issued after searching for the refrigerant leak location and the notifications are not issued during execution of the search mode, the position of the self-propelled device 5 may be notified during execution of the search mode in a manner different from that used in notifying the finding of the refrigerant leak location.

In addition, when the remote controller 96 and the body of the self-propelled device 5 can communicate with each other in both directions, real-time information of the refrigerant concentration detected by the refrigerant gas sensor 92 in the self-propelled device 5 may be sent to the remote controller 96 and displayed on a screen of the remote controller 96, for example, such that the user may recognize the refrigerant concentration. In such a case, the user can control the self-propelled device 5 to efficiently move toward the refrigerant leak location while looking at an increasing tendency of the refrigerant concentration. Thus, by controlling the self-propelled device 5 to continuously move toward a location at which the refrigerant concentration is comparatively high, the user can recognize a location at which the refrigerant concentration is maximum (namely, when the refrigerant contains a toxic component, the user can recognize a location at which the concentration of the toxic component is maximum).

Regardless of whether the remote controller 96 and the body of the self-propelled device 5 can communicate with each other in both directions, the self-propelled device 5 may be constituted, by way of example, to be able to move in an arbitrary direction at random by itself, to compare the refrigerant concentrations detected by the refrigerant gas sensor 92 at positions before and after the movement, and to automatically move in a direction in which the detected refrigerant concentration is comparatively high.

The controller 60 may be designed to determine whether an abnormality occurs in the self-propelled device 5 itself, and to notify the occurrence of the abnormality by the speaker 93 and/or the light emitting unit 94 when the abnormality has occurred. Here, the word "abnormality" implies an abnormality impeding the search for the refrigerant leak location and includes, for example, a fall of the self-propelled device 5, a reduction of the battery in the self-propelled device 5, and an abnormality of the refrigerant gas sensor 92.

A plurality of determination reference concentrations may be set with respect to the concentration detected by the refrigerant gas sensor 92, and the manners of issuing the notifications by the speaker 93 and the light emitting unit 94 may be changed depending on detection of the refrigerant gas in excess of each of the reference concentrations.

While the above description has been made, by way of example, in connection with the case in which the user operates the remote controller 96 to move the self-propelled device 5 along the refrigeration circuit 10, it is also possible, for example, to previously store information regarding the structure of a building, the layout of the refrigeration circuit 10, etc. in the storage unit 61 of the controller 60 in the self-propelled device 5 or a memory of the remote controller 96, and to make the self-propelled device 5 move by itself in accordance with the stored information regarding the structure of the building, the layout of the refrigeration circuit 10, etc. with no need of the operation by the user.

When the odorant described in the above embodiment is charged in the refrigeration circuit 10, a sensor capable of detecting the odorant may be used instead of the refrigerant gas sensor 92.

(7-4) Modification D

The above embodiment has been described, by way of example, in connection with the case in which the odorant is mixed into the refrigerant charged in the refrigeration circuit 10.

However, a fluorescent component, such as a fluorescent paint, may be mixed into the refrigerant charged in the refrigeration circuit 10. When the self-propelled device 5 described in Modification C is used in that case, the refrigerant leak location may be searched by designing the camera 95 to be able to recognize the fluorescent component, and by controlling the self-propelled device 5 to execute a process of recognizing an image of the fluorescent component, which has been taken by the camera 95, while running by itself.

The fluorescent paint is preferably a paint emitting light in the dark, a paint emitting light when exposed to an ultraviolet ray, or a mixture of those paints. Examples of the ultraviolet fluorescent paint include naphthalimide, coumarin, anthracene, phenanthrene, xanthene, thioxanthene, naphtoxanthene, fluorescein, and derivatives of the formers. When the ultraviolet fluorescent paint is used, the self-propelled device 5 preferably includes an ultraviolet lamp for emitting the ultraviolet ray.

(7-5) Modification E

The above embodiment has been described, by way of example, in connection with the case of including one refrigeration circuit 10 (i.e., one refrigerant system).

However, when multiple refrigerant systems are disposed adjacent to each other, the type of the odorant to be mixed into the refrigerant may be changed for each of the refrigerant systems.

The embodiment of the present disclosure has been described above, but it is to be understood that practical forms and individual matters can be modified in various ways without departing from the scope and the gist of the present disclosure defined in Claims.

REFERENCE SIGNS LIST

2: outdoor unit
5: self-propelled device (detection means)
10: refrigeration circuit
21: compressor
23: outdoor heat exchanger
24: outdoor expansion valve
25: outdoor fan
50: indoor unit
52: indoor heat exchanger
54: indoor expansion valve
60: controller
70: controller
81: refrigerant gas sensor
82: air temperature sensor
83: indoor heat exchange temperature sensor
92: refrigerant gas sensor (particular component detection sensor)
93: speaker (notification unit)
94: light emitting unit (notification unit)
96: remote controller
100: air conditioner (refrigeration apparatus)

CITATION LIST

PATENT LITERATURE 1
Patent Literature 1: International Publication No. WO 2017/002215

The invention claimed is:
1. A method of searching for a refrigerant leak location in a refrigeration apparatus in which a refrigerant is charged and which includes a refrigeration circuit performing a refrigeration cycle, the method comprising:
a first step of preparing the refrigeration circuit in which is charged the refrigerant, wherein the refrigerant con- tains at least one of an odor component, a toxic component, and a fluorescent component; and a second step of causing a sensor, which detects a particular component from among the at least one of the odor component, the toxic component, and the fluorescent component, the particular component being contained in the refrigerant, to be conveyed on a motor-driven robot or a flying vehicle with a propeller at least along a portion of the refrigeration circuit that is located between floors of a building or in a space behind a ceiling, and a third step of automatically halting conveyance of the sensor at a location along the portion of the refrigerant circuit at which the sensor detects at least a threshold concentration of the particular component, and issuing an audible and/or light-emitting notification at the halted location to specify the halted location is a leak location.

2. The method of searching for the refrigerant leak location according to claim 1, wherein the refrigerant is a single one or a mixture of two or more among a flammable refrigerant, a low flammable refrigerant, a very low flammable refrigerant, and a highly toxic refrigerant.

3. The method of searching for the refrigerant leak location according to claim 1, wherein the refrigerant is R32 or a refrigerant having a lower GWP value than R32.

4. The method of searching for the refrigerant leak location according to claim 1, wherein the refrigerant contains the odor component.

5. The method of searching for the refrigerant leak location according to claim 1, wherein the refrigerant contains the toxic component.

6. The method of searching for the refrigerant leak location according to claim 4, wherein the refrigerant contains the odor component, and a location at which a concentration of the odor component is maximum or higher than a predetermined concentration is specified in the second step, or the refrigerant contains the toxic component, and a location at which a concentration of the toxic component is maximum or higher than a predetermined concentration is specified in the second step.

7. The method of searching for the refrigerant leak location according to claim 1, wherein the refrigerant contains the fluorescent component.

8. The method of searching for the refrigerant leak location according to claim 1, wherein the sensor is conveyed by the flying vehicle with the propeller, and the flying vehicle is driven and operated by a drive motor.

9. The method of searching for the refrigerant leak location according to claim 1, wherein the motor-driven robot or drone includes at least one of a speaker and a light-emitting device configured to issue a notification depending on a detection result of the particular-component detection sensor.

* * * * *